United States Patent
Agrawal et al.

(10) Patent No.: US 10,616,398 B2
(45) Date of Patent: *Apr. 7, 2020

(54) COMMUNICATION SESSION MODIFICATIONS BASED ON A PROXIMITY CONTEXT

(71) Applicant: Motorola Mobility LLC, Chicago, IL (US)

(72) Inventors: Amit Kumar Agrawal, Bangalore (IN); Rachid M. Alameh, Crystal Lake, IL (US); Giles Tucker Davis, Downers Grove, IL (US)

(73) Assignee: Motorola Mobility LLC, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/544,441

(22) Filed: Aug. 19, 2019

(65) Prior Publication Data

US 2019/0373104 A1    Dec. 5, 2019

Related U.S. Application Data

(63) Continuation of application No. 15/904,160, filed on Feb. 23, 2018, now Pat. No. 10,432,779.

(51) Int. Cl.
| | |
|---|---|
| *H04M 3/42* | (2006.01) |
| *H04M 11/00* | (2006.01) |
| *H04M 11/10* | (2006.01) |
| *G06F 15/173* | (2006.01) |
| *H04M 1/725* | (2006.01) |
| *H04W 76/10* | (2018.01) |

(Continued)

(52) U.S. Cl.
CPC ....... *H04M 1/72569* (2013.01); *H04W 76/10* (2018.02); *G06K 9/00288* (2013.01); *G06K 2009/00322* (2013.01); *G08B 3/1016* (2013.01); *H04M 2250/12* (2013.01)

(58) Field of Classification Search
CPC .......... H04M 1/72569; H04M 2250/12; G06K 2009/00322; G06K 9/00288; G08B 3/1016
USPC ...................................................... 455/414.1
See application file for complete search history.

(56) References Cited

U.S. PATENT DOCUMENTS

| | | |
|---|---|---|
| 8,614,733 B2 | 12/2013 | Kato |
| 9,231,845 B1 | 1/2016 | Goldstein et al. |

(Continued)

OTHER PUBLICATIONS

"Final Office Action", U.S. Appl. No. 15/904,160, dated Jul. 10, 2019, 34 pages.

(Continued)

*Primary Examiner* — German Viana Di Prisco
*Assistant Examiner* — Mark G. Pannell
(74) *Attorney, Agent, or Firm* — SBMC

(57) ABSTRACT

Techniques described herein provide modifications to a communication session based on a proximity context. Various implementations establish a communication session between a local communication device and a remote communication device. In response to establishing the communication session, one or more implementations determine a proximity context associated with an area around the local device, such as by detecting a proximity of various objects to the local device. Upon determining the proximity context, various embodiments alter various operating parameters associated the communication session, such as by reducing a speaker volume and/or announcing the presence of a person within proximity to the local device.

20 Claims, 13 Drawing Sheets

(51) Int. Cl.
    *G08B 3/10*    (2006.01)
    *G06K 9/00*    (2006.01)

(56)            References Cited

U.S. PATENT DOCUMENTS

| 9,571,628 B1 | 2/2017 | Bostick et al. |
| 10,432,779 B2 | 10/2019 | Agrawal et al. |
| 2008/0192977 A1 | 8/2008 | Gruenhagen et al. |
| 2008/0242265 A1 | 10/2008 | Cohen et al. |
| 2009/0097671 A1 | 4/2009 | Paradiso et al. |
| 2013/0078962 A1 | 3/2013 | Clarke et al. |
| 2013/0150117 A1 | 6/2013 | Rodriguez et al. |
| 2013/0225199 A1 | 8/2013 | Shaw |
| 2014/0055553 A1 | 2/2014 | Lee et al. |
| 2015/0009278 A1 | 1/2015 | Modai |
| 2015/0172462 A1 | 6/2015 | Cudak et al. |
| 2016/0301373 A1 | 10/2016 | Herman et al. |
| 2017/0097413 A1 | 4/2017 | Gillian et al. |
| 2019/0268460 A1 | 8/2019 | Agrawal et al. |

OTHER PUBLICATIONS

"Final Office Action", U.S. Appl. No. 15/904,160, dated Nov. 27, 2018, 37 pages.
"Non-Final Office Action", U.S. Appl. No. 15/904,160, dated Mar. 27, 2019, 33 pages.
"Non-Final Office Action", U.S. Appl. No. 15/904,160, dated Aug. 14, 2018, 33 pages.
"Notice of Allowance", U.S. Appl. No. 15/904,160, dated Jul. 29, 2019, 8 pages.

600

| Distance Range | Attenuation |
|---|---|
| 0-2 meters | 20 dB |
| 2-4 meters | 15 dB |
| 4-6 meters | 10 dB |
| 6-8 meters | 5 dB |
| 8+ meters | No Attenuation |

602 / 604

606

| User Age | Attenuation Factor |
|---|---|
| 10-15 | .8 |
| 15-25 | 0.9 |
| 25-45 | 1 |
| 45-65 | 0.8 |
| 65+ | 0.5 |

COMMUNICATION SESSION MODIFICATIONS BASED ON A PROXIMITY CONTEXT

RELATED APPLICATIONS

This application is a continuation of U.S. patent application Ser. No. 15/904,160, filed Feb. 23, 2018, entitled "Communication Session Modifications Based on a Proximity Context", the disclosure of which is hereby incorporated by reference herein in its entirety.

BACKGROUND

Computing devices provide users with the ability to exchange real-time audio with one another during a communication session. For example, a user can initiate an audio call to a co-worker using a mobile communication device in locations outside of a work environment. By providing the ability to conduct communication sessions, mobile devices oftentimes place users in environments where conversations can be overheard by people in the surrounding area, such as patrons at a coffee shop, shoppers in a store, diners a restaurant, and so forth. In turn, the user may unintentionally divulge sensitive information to these people.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

FIG. 6 illustrate example lookup tables that can be used to derive audio attenuation in accordance with one or more implementations;

DETAILED DESCRIPTION

Figure 1:
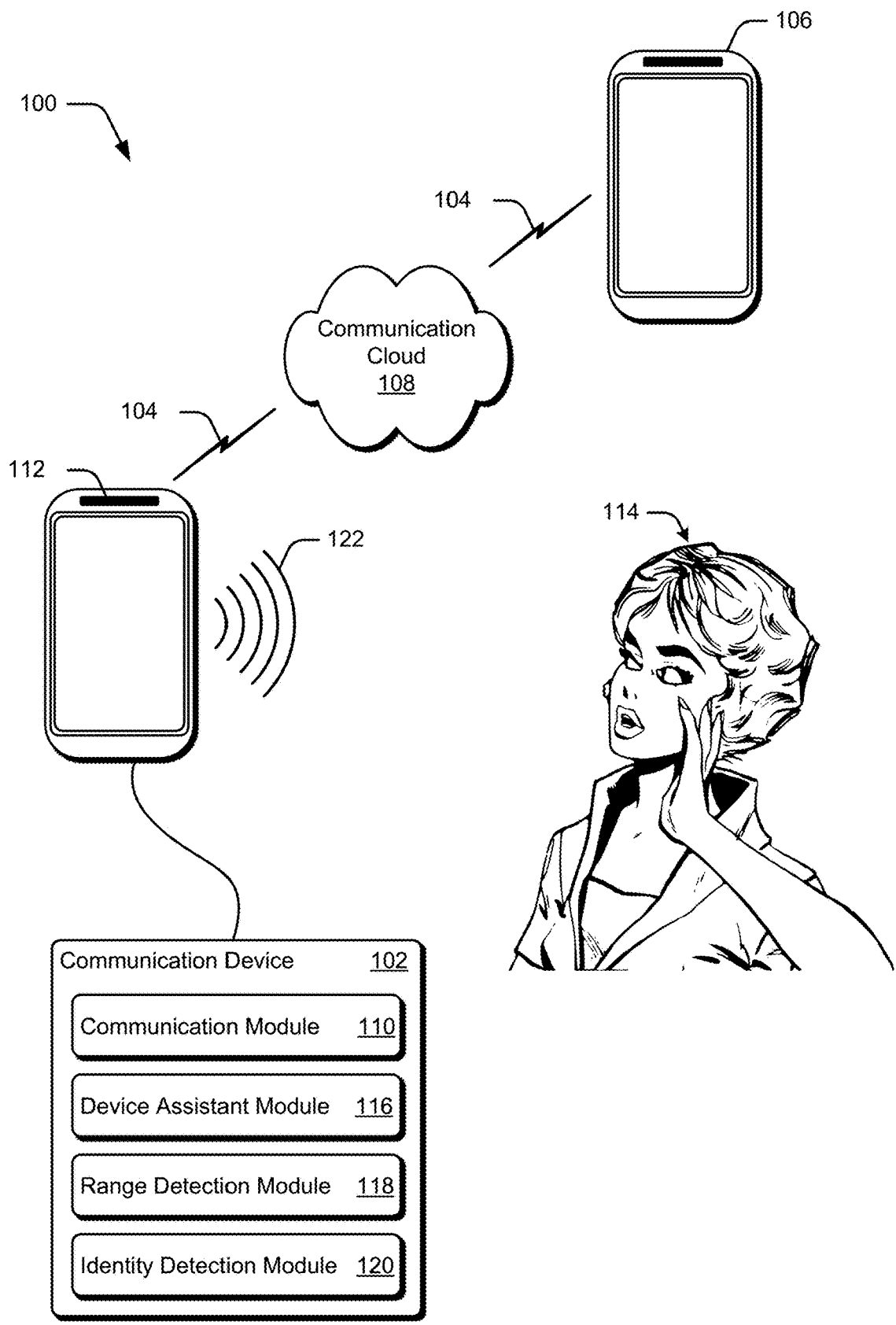
FIG. 1 is an overview of a representative environment that includes an example of modifying a call based on a proximity context in accordance with one or more implementations.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

Techniques described herein provide modifications to a communication session based on a proximity context. Various implementations establish a communication session between a local communication device and a remote communication device. In response to establishing the communication session, one or more implementations determine a proximity context associated with an area around the local device, such as by detecting a proximity of various objects to the local device. Upon determining the proximity context, various embodiments alter various operating parameters associated the communication session, such as by reducing a speaker volume and/or announcing the presence of a person within proximity to the local device.

Consider now an example environment in which various aspects as described herein can be employed.

Example Environment

FIG. 1 illustrates an example environment 100 in accordance with one or more implementations. Environment 100 includes a communication device 102 in the form of a mobile communication device that is capable of conducting a communication session with another device. Accordingly, in environment 100, communication device 102 conducts a communication session 104 with remote communication device 106, where communication device 102 represents a local device associated with a user conducting the communication session. Similarly, remote communication device 106 represents a device that is remote from communication device 102 and is associated with a different user participating in the communication session.

Communication session 104 generally represents a real-time communication exchange between multiple communication devices. While environment 100 illustrates the participating communication devices as mobile communication devices, alternate or additional implementations include any number of communication devices of any type in the communication session. A real-time communication exchange can include the exchange of real-time audio and/or the exchange of video. Here, the phrase "real-time" is used to signify an exchange of audio and/or video between devices in a manner that mimics real-world exchanges. For example, the processing and propagation of signals used to exchange audio and/or video can sometimes encounter delays due to real-world properties of the electronic components and/or the communication channels. However, the same delay (in general) is applied to the whole of the audio and/or video such that once the delay is encountered at a receiving device, the exchange continues on with little to no delay. In other words, the delay is generally a constant such that once an initial delay is encountered to exchange the audio, users see the video and/or hear the audio as they would in the real-world. Alternately or additionally, the communication session can include the exchange of finite clips of prerecorded video, such as the exchange of a video clip over text messaging.

Communication cloud 108 generally represents a communication network that facilitates a bi-directional link between computing devices. This can include multiple interconnected communication networks that comprise a plurality of interconnected elements, such as a wireless local area network (WLAN) with Ethernet access, a wireless telecommunication network interconnected with the Internet, a wireless (Wi-Fi) access point connected to the Internet, a Public Switched Telephone Network (PSTN), and so forth. Accordingly, communication cloud 108 provides connectivity between communication device 102 and remote communication device 106.

To facilitate communications, communication device 102 includes communication module 110 provides the ability to conduct a communication session. Accordingly, communication module 110 generally represents any suitable combination of hardware, software, and/or firmware used to facilitate the exchange of audio and/or video, as well as other information. For instance, communication module 110 can include one or more protocol stacks associated with a network over which the communication session is conducted, client software that supplies a user interface used to initiate and/or terminate the communication session, firmware that drives hardware to generate signals and/or process messages used in maintaining the communication session, and so forth. Various implementations of communication module 110 receive audio input from a microphone associated with communication device 102 (not illustrated here), and forward the audio input to remote communication device 106 part of communication session 104. Alternately or additionally, communication module 110 forwards audio received from remote communication device 106 over the communication session to a speaker 112 for projection. In some implementations, communication module 110 receives video input (e.g., synchronized images and audio) from a camera associated with communication device 102, and forwards the video input to remote communication device 106. Thus, communication module 110 enables communication device 102 to send and/or receive various types of information in various formats over a communication session (e.g., audio, video, protocol messaging, etc.).

Environment 100 includes person 114, who generally represents a non-call participant. In other words, person 114 represents a person who is located within an arbitrary proximity to communication device 102, but is not a participant in communication session 104. In various implementations, the proximity of person 114 can pose a risk to the information exchanged over communication session 104. Depending upon how close person 114 is, some of the information exchanged over the communication session can be unintentionally exposed to person 114 via the audio output generated by speaker 112. To mitigate the risk of person 114 overhearing information, communication device 102 includes device assistant module 116, range detection module 118, and identity detection module 120.

Device assistant module 116 identifies an operating context associated with communication device 102, and provides recommendations based on that operating context, a proximity context, and/or a combination of the proximity context and the operating context as further described herein. Alternately or additionally, device assistance module 116 performs various actions associated with the recommendations without user intervention. As one example, device assistant module 116 analyzes a proximity context generated by range detection module 118 and/or identity detection module 120 while a communication session is in progress, and modifies the communication session based on the analysis, such audio levels, proximity notifications, and so forth.

As another example, various implementations determine an operating context that indicates the communication device is conducting a communication session in a private mode, rather than speaker mode. The phrase "private mode" denotes an audio output mode that directs audio to an earpiece to, and/or plays audio at an output level configured for, a speaker physically located next to a user's ear to reduce a project path of the audio and increase the privacy of the audio. Conversely, the phrase "speaker mode" denotes an audio output mode that directs the audio to, and/or plays audio at an output level configured for, a speaker away from the user's ear to increase the audio projection path to allow multiple people access to the audio. Some implementations reduce and/or attenuate the audio output level associated with speaker 112 in response to detecting a proximity of person 114 and identifying the private mode operating context. Conversely, if the communication device is in speaker mode, various implementations determine to not modify a communication session based on a proximity context as further described herein. Alternately or additionally, some implementations amplify and/or revert back to an original audio output level in response to detecting that person 114 has moved from being within a predefined proximity to outside of a predefined proximity, that the communication device has transitioned to a speaker mode, and so forth. Accordingly, device assistant module 116 analyzes a proximity context and/or operating context, and makes determinations on how to manage communication session 104 based on these analyses. To determine how to manage communication session features, device assistant module 116 communicatively couples to, or interfaces with, range detection module 118 and/or identity detection module 120.

Range detection module 118 maps an area surrounding the communication device to provide a proximity context. Accordingly, range detection module 118 generally represents any combination of hardware, software, and/or firmware used to determine characteristics about a surrounding area. In some implementations, range detection module 118 includes, and/or interfaces with, a depth sensor, such as an Infrared (IR) imager, a stereo depth sensor, a time-of-flight sensor, and so forth, that transmits electromagnetic waveforms (e.g., laser signals 122) outward from communication device 102. In turn, the signals reflect off of objects in the area, such as person 114, to generate return signals that are process to obtain characteristics about the surrounding area as further described herein. Some implementations of range detection module 118 configure how the signals are transmitted out (e.g., what a propagation pattern is used) as a way to change the signals for a particular detection purpose. For instance, range detection module 118 can configure the signals for object presence detection over a wide area, configure the signals to concentrate a particular area to obtain the detailed information for identification purposes, and so forth. This can include managing different types of sensors, such as a laser-based detection sensor, an image-based detection sensor, a radio frequency (RF) based detection sensor, and so forth. Thus, range detection module 118 generates information about an area surrounding communication device 102 to generate proximity context.

Identity detection module 120 uses proximity context information generated by range detection module 118 to authenticate and/or identify a particular person from other people. Alternately or additionally, identity detection module 120 analyzes input audio from a microphone and/or communication session 104 for identification purposes (e.g., a particular person, key words, etc.). To demonstrate, identity detection module 120 can include facial recognition algorithms as a way to characterize various facial features of person 114 using information generated from the return signals and/or an image capture from a camera sensor. In turn, identity detection module 120 maps the characterized facial features to a particular user identity, such as by comparing the characterized facial features to known facial features. This can include using images tagged or associated with a particular user as a baseline for the known facial features. Various implementations of identity detection module 120 apply voice recognition algorithms and/or speech recognition algorithms to audio input as a way to identify a particular person and/or keywords. Device assistant module 116 can query the identity detection module for the identification and/or the identity detection module can push this information to device assistant module. Further, any audio can be analyzed, such as audio transmitted over communication session 104, audio captured by a microphone of communication device 102, etc.

Figure 2:
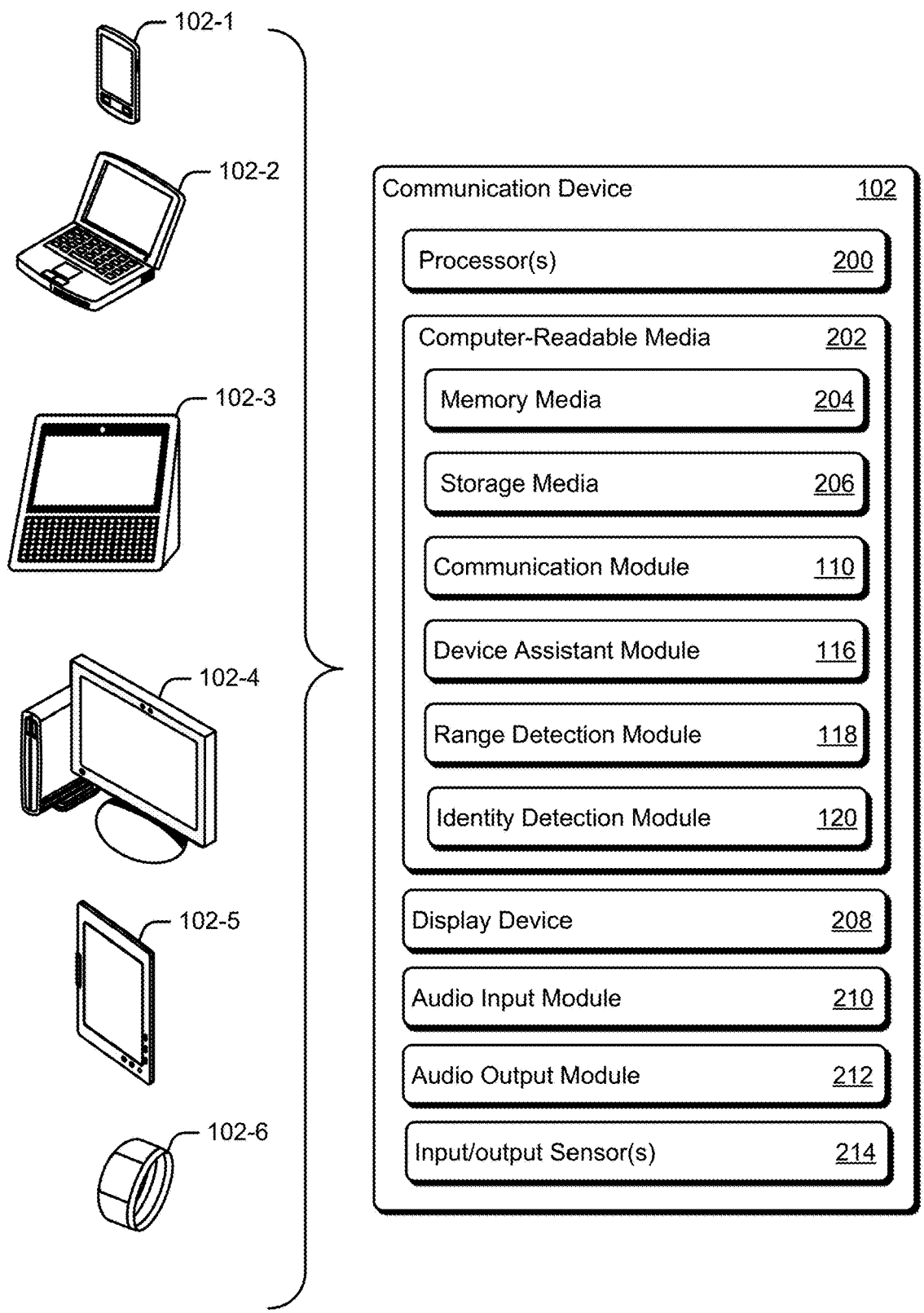
FIG. 2 illustrates a more detailed example of various devices capable of providing call modifications based on a proximity context in accordance with one or more implementations.

FIG. 2 illustrates an expanded view of communication device 102 of FIG. 1 with various non-limiting example devices including: smartphone 102-1, laptop 102-2, home assistant device 102-3, desktop 102-4, tablet 102-5, and smart watch 102-6. Accordingly, communication device 102 represents any mobile device, mobile phone, client device, wearable device, tablet, computing, communication, entertainment, gaming, media playback, and/or other type of electronic device that incorporates call management based on proximity context as further described herein. A wearable device may include any one or combination of a watch, armband, wristband, bracelet, glove or pair of gloves, glasses, jewelry items, clothing items, any type of footwear or headwear, and/or other types of wearables.

Communication device 102 includes processor(s) 200 and computer-readable media 202, which includes memory media 204 and storage media 206. Applications and/or an operating system (not shown) embodied as computer-readable instructions on computer-readable media 202 are executable by processor(s) 200 to provide some, or all, of the functionalities described herein. For example, various embodiments access an operating system module that provides high-level access to underlying hardware functionality by obscuring implementation details from a calling program, such as protocol messaging, register configuration, memory access, and so forth.

Computer-readable media 202 also includes communication module 110, device assistant module 116, range detection module 118, and identity detection module 120 of FIG. 1. While communication module 110, device assistant module 116, range detection module 118, and identity detection module 120 are illustrated here as residing on computer-readable media 202, they can alternately or additionally be implemented using hardware, firmware, software, or any combination thereof.

Communication device 102 optionally includes display device 208 that can be used to render content. In response to proximity context information, various implementations display notifications and/or alerts via display device 208 to notify a user about people and/or objects within a predetermined proximity of communication device 102 as determined by range detection module 118 and/or identity detection module 120.

Audio input module 210 represents functionality that captures sound external to communication device 102, such as a microphone, and converts the sound into various formats and/or representations that can be processed by communication device 102. Accordingly, various implementations of audio input module 210 forward the captured audio to range detection module 118 and/or identity detection module 120 for the identification of keywords, a particular person's identity, and/or background noise characteristics as further described herein.

Audio output module 212 represents any suitable type of device that can be used to project audible sounds, tones, and/or information, such as speaker 112 of FIG. 1. Various implementations of audio output module 212 use combinations of hardware, firmware and/or software to output the audible sound, such as a device driver that programmatically controls and/or drives hardware. In some implementations, device assistant module 116 manages an audio output level associated with audio output module 212 such that device assistant module 116 can amplify and/or attenuate the sounds generated by audio output module 212.

Communication device 102 also includes input/output sensors 214 to generate proximity context information about a surrounding area. The input/output sensors can include any combination of hardware, firmware, and/or software used to capture information about external objects. In some implementations, input/output sensors include a light output module, such as a laser source, to project light outward. In turn, input/output sensors can include input modules to capture reflected signals, such as image-capture elements (e.g., pixel arrays, CMOS or CCD photo sensor arrays, photodiodes, photo sensors, single detector arrays, multi-detector arrays, etc.) Alternately or additionally, input/output sensors 214 includes other types of input/output sensors to transmit and/or receive various types of electromagnetic waveforms, such as a camera, a proximity detector, an infrared sensor, an audio detector, a radio frequency (RF) based detector, antenna, and so forth. As an example, various implementations use time-of-flight sensors to obtain a depth map of the surrounding area.

Having described an example operating environment in which various aspects of call modifications based on proximity context can be utilized, consider now a discussion of identifying a proximity context in accordance with one or more implementations.

Identifying a Proximity Context

Various computing devices provide users with the ability to establish communication sessions with other devices, such as voice and/or video call functionality. When the computing device is a portable device, such as a mobile communication device, a user can conduct communication exchanges in environments that include other people. Oftentimes, the user is unaware or lackadaisical about who is within hearing distance, and unintentionally exposes sensitive and/or private information.

Various implementations determine a proximity context of a communication device, and use the proximity context to determine whether make modifications to a call that is in progress. Alternately or additionally, some implementations identify an operating context of the communication device that is used in determining what modifications to perform.

Figure 3:
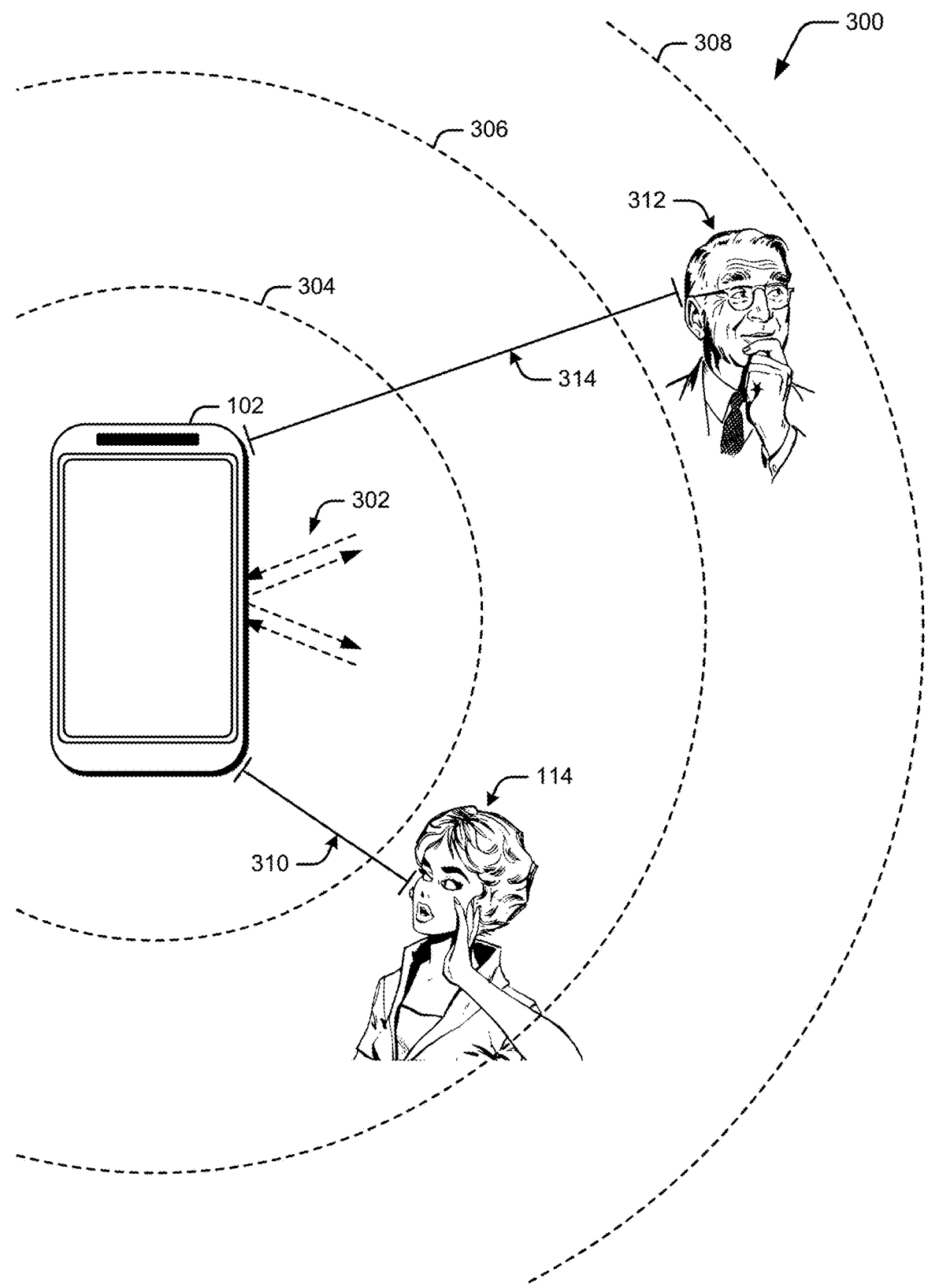
FIG. 3 illustrates an example of identifying a proximity context using range detection in accordance with one or more implementations.

To demonstrate, consider FIG. 3 that illustrates an environment 300 in which a communication device determines a proximity context in accordance with one or more embodiments. Environment 300 includes communication device 102 of FIG. 1 engaged in a communication session with another communication device (not illustrated here), where the communication device operates in a private mode. While the communication session is active, communication device 102 identifies a proximity context by scanning a surrounding area, such as by way of range detection module 118 and/or identity detection module 120. Here, the surrounding area corresponds to an area around the communication device where the communication device can successfully transmit and receive various types of signals as further described herein. Alternately or additionally, the communication device can define the surrounding area using a predetermined shape of a predetermined size. Any suitable event can trigger a scan of the surrounding area, such as the user initiating the communication session, a successful establishment of the communication session, an audio input level exceeding a predetermined threshold, an identified audio output level exceeding a predetermined threshold, an identified operating context (e.g., a private mode), and so forth. The communication device can scan the area in any suitable manner, such as continuously, periodically, for a predetermined number of times, and so for. Various implementations automatically initiate the scanning without user intervention.

In environment 300, communication device 102 transmits and/or receives various waveforms 302. For example, input/output sensors 214 of FIG. 2 transmit out electromagnetic waves (e.g., radio frequency (RF) signals, infrared light, gamma rays, microwave signals, etc.), and receive reflected signals that are analyzed to characterize the surrounding area. Since the electromagnetic waves adhere to various wave and particle properties, the waves behave in known manners, such as constructive interference, destructive interference, reflection, refraction, and so forth. As the transmitted waves reflect off of objects in the area, the communication device receives the reflected waves, and performs various analyses using knowledge of these properties to obtain characteristics about objects in the surrounding area. As an example, some implementations use a time-of-flight ranging system that transmits a light signal, and measures the time-of-flight for the light signal to an object as a way to determine the object's distance. Accordingly, various implementations analyze transmitted and/or return waveforms to determine a size, a shape, a distance, a velocity, and so forth, of objects in a surrounding area. Accordingly, waveforms 302 generally represent the transmission and/or the reception of information (e.g., electromagnetic waves) by communication device 102.

In environment 300, communication device 102 identifies three surrounding regions, where each region has a circular shape with a boundary corresponding to the respective circle's radius: boundary 304, boundary 306, and boundary 308. While the regions are described as being circular, any other shape, size, or metric can be used to characterize the area. Some implementations alternately or additionally characterize the surrounding area by determining the respective distances of various objects to the communication device. Here, the communication device determines that person 114 is at a distance 310 from the communication device, where distance 310 represents an arbitrary value. Similarly, the communication device determines that person 312 is at a distance 314 from the communication device, where distance 314 represents an arbitrary value. In this example, the communication device also determines that person 114 is located in the region that resides between boundary 304 and boundary 306, and that person 312 is located in the region that resides between boundary 306 and boundary 308. However, any other suitable combination and/or type of characteristics about a surrounding area can be identified for determining what modifications to make to a communication session. Various implementations identify other characteristics corresponding to the surrounding area, such as user identity, user age, user direction, velocity, direction, etc.

To illustrate, various implementations of communication device 102 identify that person 114 corresponds to a young woman whose face is pointed in a direction towards the communication device, and that person 114 is closer to the communication device than person 312. Alternately or additionally, the communication device identifies that person 312 is an older man whose face is pointing away from the communication device, and is farther from the communication device relative to person 114. These various characteristics can then be used to determine the call modifications to perform as further described herein. For instance, some implementations select person 114 to base various call modifications on, since person 114 is located closer to the communication device than person 312. As another example, various implementations base the call modifications on characteristics of person 114 since she is facing towards the device, and person 312 is facing away from the device.

In various embodiments, the communication device reconfigures waveforms 302 to obtain additional information. For example, the area identification process can transmit a first set of signals that provide object presence detection, and then reconfigure the signals to transmit a second set of signals that provide information that can be used to identify a particular user identity, user gender, user age, and so forth. Alternately or additionally, multiple different types of sensors can be used. For instance, an RF-based detection system can be used to first identify the presence of a user and, upon detecting the presence of a user, obtain an image from a second sensor (e.g., a camera-based depth sensor) that is processed using facial recognition algorithms. Accordingly, multiple different sensors can be used in combination and/or at various stages to provide a proximity context. This can include determining a proximity context based on input audio.

Figure 4:
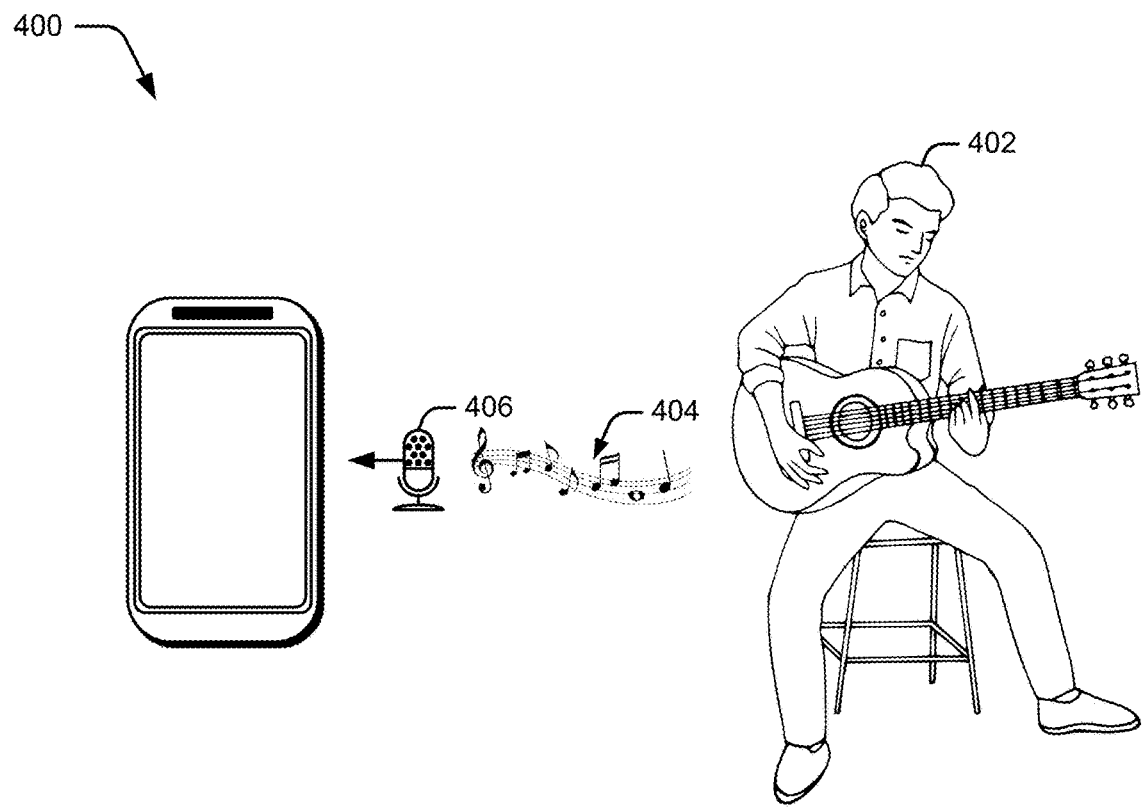
FIG. 4 illustrates examples of identifying a proximity context based on input audio in accordance with one or more implementations.
Figure 4:
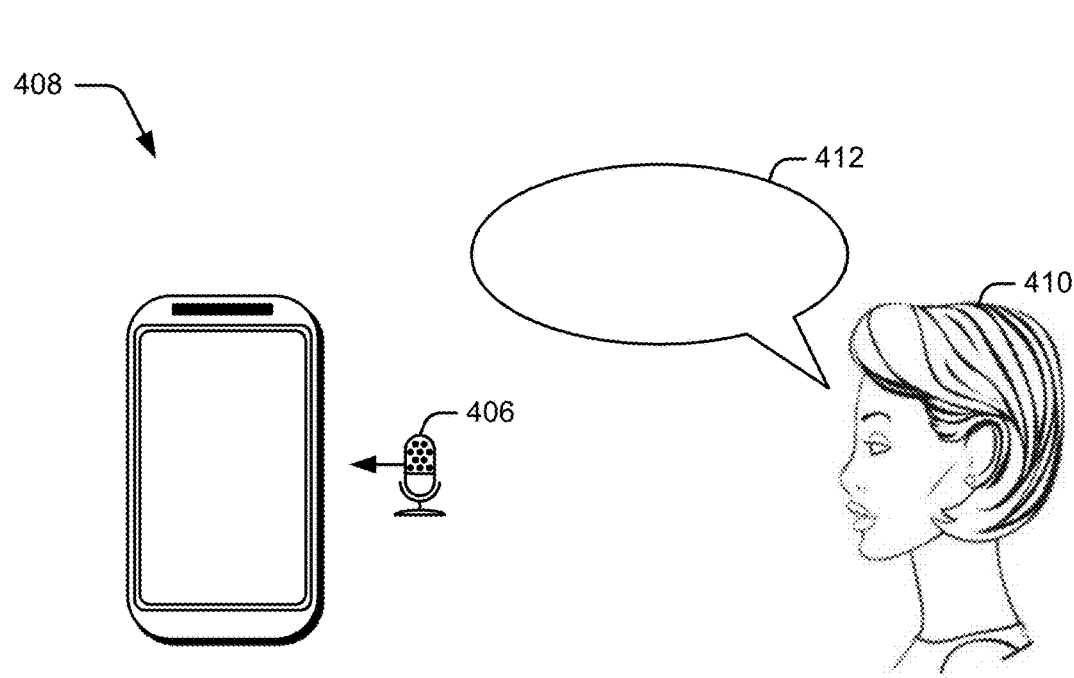

To further illustrate, now consider FIG. 4 that illustrates various examples of identifying a proximity context in accordance with one or more embodiments. In some scenarios, FIG. 4 can be considered a continuation of one or more examples described with respect to FIGS. 1-3. The upper portion of FIG. 4 illustrates an environment 400 that includes communication device 102 of FIG. 1. In environment 400, the communication device actively conducts a voice call with a remote device. Environment 400 also includes a non-call participant: person 402. Instead of participating in the communication session, person 402 resides in the background playing a guitar that generates background noise 404. Various implementations determine a proximity context associated with communication device 102 by identifying the audio level of audio external to the communication session (e.g., background noise 404). For instance, communication device 102 can determine a decibel (dB) level of the background noise by using microphone 406 to capture background noise 404, and process the audio to identify a background noise audio level as part of a proximity context.

The determination to identify background noise can sometimes be based on previously identified context information. For instance, some implementations first identify the presence of person 402 using various object sensing techniques describe herein. In response to identifying the presence of a person, communication device 102 activates microphone 406 to capture and analyze background noise 404. Accordingly, in the upper portion of FIG. 4, the communication device uses multiple sensors to determine a proximity context, one of which includes a microphone for audio capture and/or background noise analysis. While described as a sequential process in which the sensors are utilized at different times, other implementations utilize the sensors in parallel and/or concurrently.

Other types of proximity context information can be identified from sound as well. Moving to the lower portion of FIG. 4, consider now environment 408 that includes communication device 102 of FIG. 1 and person 410. In environment 408, communication device 102 is actively conducting a communication session with a remote device, while person 410 represents a non-call participant within a predetermined proximity to the communication device. Accordingly, since person 410 is not a participant of the communication session, she conducts a separate conversation 412. In turn, communication device 102 determines to characterize a proximity context associated with background noise, and captures conversation 412 via microphone 406. After capturing portions of conversation 412, communication device 102 processes the audio, such as by applying voice recognitions algorithms to determine an identity of person 410 and/or speech algorithms that identify one or more keywords from the audio (e.g., a name, a location, business name, etc.). In turn, the communication device 102 can make call modifications to the communication session based on this proximity context, as further described herein.

Having described aspects of identifying a proximity context during a communication session, consider now a discussion of modifying a communication session based on a proximity context in accordance with one or more implementations.

Modifying a Communication Session Based on a Call Proximity

The portability of devices enables user to conduct audio and/or video calls in varying locations. This provides the user with more flexibility relative to fixed landlines since the user is able to conduct calls at any moment and at any location. However, these varying locations oftentimes include people, thus creating a potential risk of the user inadvertently divulging information to these people. Various implementations modify a communication session based on an identified proximity context.

Figure 5:
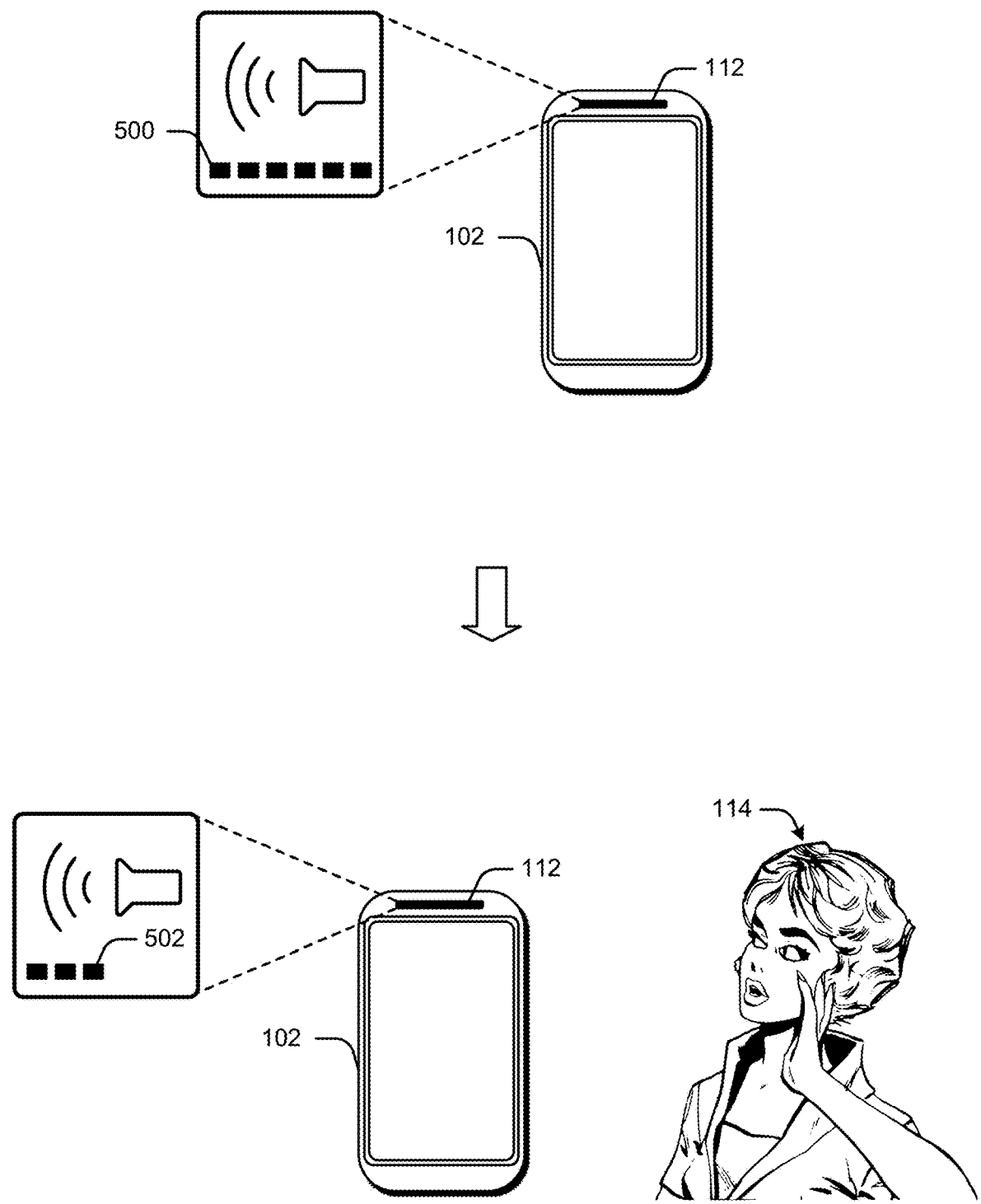
FIG. 5 illustrates an example of a call modification based on a proximity context in accordance with one or more implementations.

To demonstrate, consider now FIG. 5 that illustrates communication device 102 of FIG. 1. In various implementations, FIG. 5 represents a continuation of one or more of the examples described with respect to FIGS. 1-4. In the upper portion of FIG. 5, the communication device is engaged in a communication session with a remote device (not illustrated here). As part of the communication session, the remote device generates audio, and transmits the audio to communication device. In turn, communication device 102 projects the audio out of speaker 112 at audio level 500, which represents a maximum level supported by the communication device 102. This is further indicated through the display of five bars, where each respective bar corresponds to an arbitrary unit corresponding to audio levels (e.g., 3 dB per bar, 5 dB per bar, etc.). Audio level 500 can be set in any suitable manner, such as through a user defined audio level, a default audio level, a communication session default audio level, and so forth. During the communication session, communication device 102 (by way of range detection module 118 and/or identity detection module 120) scans the surrounding environment to identify a proximity context and/or operating context, examples of which are provided herein. The scanning can occur continuously, periodically, for a predetermined number of times, and so forth. Accordingly, various implementations update the proximity context over time.

Continuing on, the lower portion of FIG. 5 represents an arbitrary point in time during the communication session in which person 114 moves within a predetermined proximity to communication device 102. As further described herein, the communication device identifies various characteristics associated with person 114 using the proximity context information, such as a distance the user is from the communication device, a region in which the user is located, an identity of the user, a direction in which the user is facing, an age of the user, and so forth. In response to the characteristics identified via the proximity context, communication device 102 attenuates the audio output from speaker 112 to audio level 502. While illustrated here as an attenuation of two audio level units, any other attenuation can be applied. To determine what attenuation to apply, various implementations use the proximity context information in combination with lookup tables.

Consider now FIG. 6 that illustrates various examples of lookup tables. In some implementations, FIG. 6 represents a continuation of one or more of the examples described with respect to FIGS. 1-5. The upper portion of FIG. 6 includes lookup table 600 that maps distance ranges with attenuation values, where closer distances correspond to more attenuation. For instance, contemplate now a scenario in which the proximity context identifies that person 114 is 3.2 meters away from the communication device. Various implementations access lookup table 600 and determine that the user identified distance falls into range 602. Since range 602 corresponds to attenuation 604, the communication device applies 15 dB attenuation to the audio output at speaker 112. While lookup table presents attenuation information relative to identified distances, other types of lookup tables and/or information can be utilized as well.

Moving to the lower portion of FIG. 6, lookup table 606 maps a user's age to an attenuation factor. In various implementations where the proximity context identifies a user's age, a lookup table, such as lookup table 606, can be used singularly or in combination with other lookup tables to identify the attenuation factor. Here, the proximity context determines that person 114 has an age that falls within age range 608, which corresponds to an attenuation factor 610. Various implementations apply the attenuation factor to either an existing audio level at which a speaker currently operates, or an attenuation amount identified from proximity context. Recall the scenario in which the communication device determines to apply a 15 dB attenuation based on the user's distance. Using the combination of distance and age proximity context information, the communication device applies the attenuation factor identified in lookup table 606 to the 15 dB attenuation indicated by lookup table 600, resulting in an attenuation of: 15 dB*0.8=12 dB. Accordingly, some implementations use multiple proximity context parameters to determine whether to attenuate or amplify an audio output level, where the information obtained from the lookup table(s) is aggregated using various algorithms to weight and/or combine the information.

It is to be appreciated that the lookup tables described herein are for discussion purposes, and are not intended to be limiting. For instance, a lookup table can reference multiple proximity context parameters of any suitable type, such as background noise levels (e.g., noisy environments apply less attenuation to the audio output level than quiet environments), what direction a user is facing, a particular user identity, and so forth. As one example, in response to identifying a particular user, some implementations use the identity to obtain other types of information about the user instead of deriving the information from the sensors, such as referencing stored information about the user's age, hearing loss information, and so forth. The obtained information can then be used to determine an attenuation level, such as by using a lookup table based on hearing loss information. As another example, if a user is facing away from the communication device, various implementations access a lookup table based on a directional information, where the proximity context identifying a rotation angle the user's face is positioned at relative to front. In turn, the communication device can access a lookup table that relates the rotation angle to an attenuation amount (e.g., less attenuation applied for away-facing directions, more attenuation applied for towards-facing directions).

Figure 7:
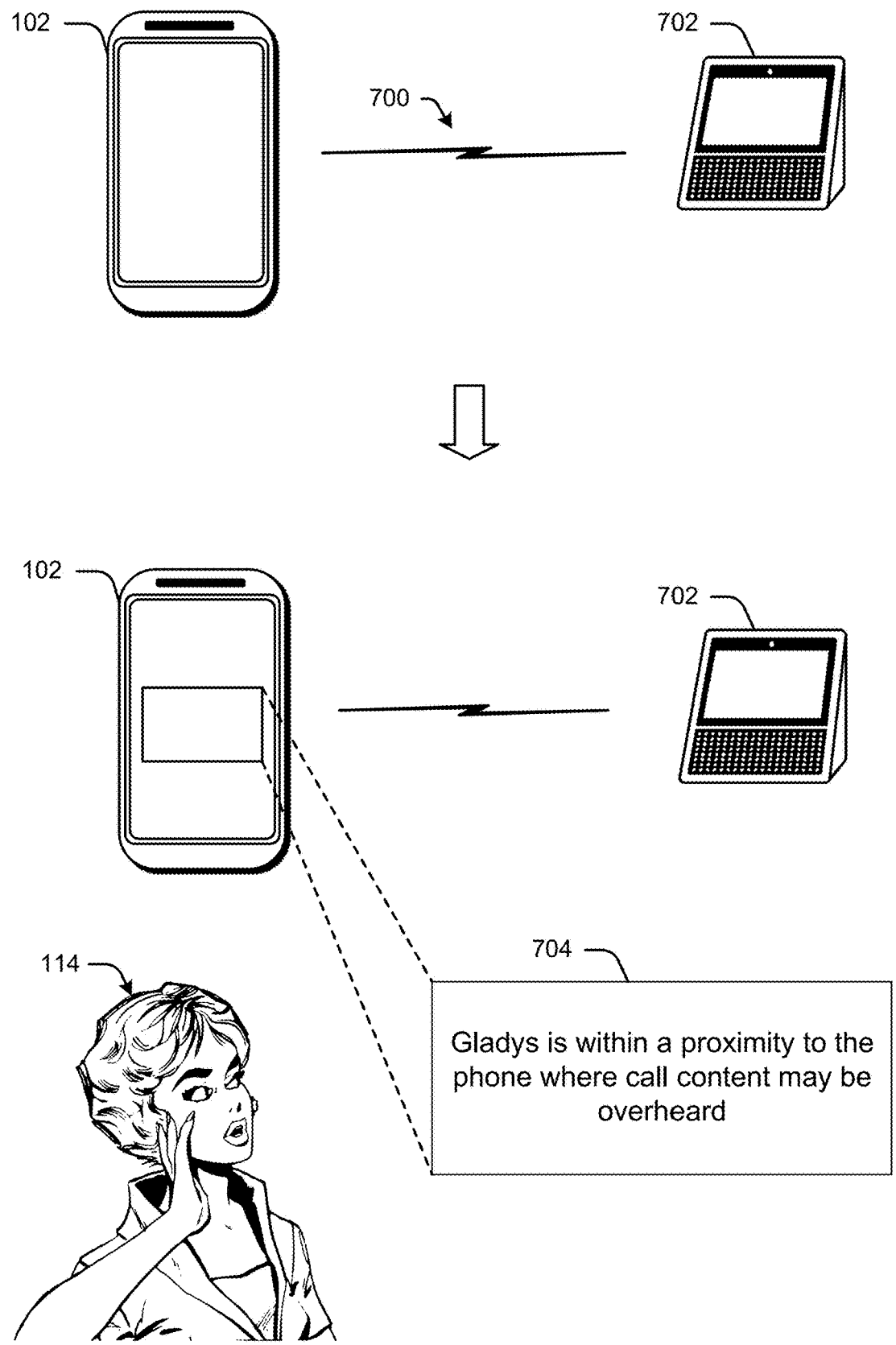
FIG. 7 illustrates an example call alert in accordance with one or more implementations.

Consider now FIG. 7 that illustrates another example of making communication session modifications based on a proximity context. In various implementations, FIG. 7 can be considered a continuation of one or more examples described with respect to FIGS. 1-6. In the upper portion of FIG. 7, communication device 102 engages in a communication session 700 with remote home assistant 702. During the communication session, communication device 102 scans the surrounding area to determine a proximity context as further described herein. In the upper portion of FIG. 7, the proximity context determines that no users are in a surrounding area.

Moving to the lower portion of FIG. 7, the proximity context identifies at a later point in time that person 114 has moved within a predetermined proximity/distance to the communication device, and has also identified person 114 as a particular user, such as through the use of facial recognition algorithms, voice recognition algorithms, etc. In response to the identified proximity context information, communication device 102 modifies communication session 700 by displaying alert 704 on a display associated with communication device 102. Alternately or additionally, communication device 102 transmits messages and/or commands over communication session 700 that invoke the display of alert 704 at remote home assistant 702. Accordingly, communication device 102 can visibly display an alert at the communication device and/or invoke the display of an alert at a remote device. Some implementations generate audio alert that is output at communication device 102 and/or is transmitted over communication session 700 for output at remote home assistant 702. The audible alert can either be in combination with a displayed alert, or instead of a displayed alert.

Figure 8:
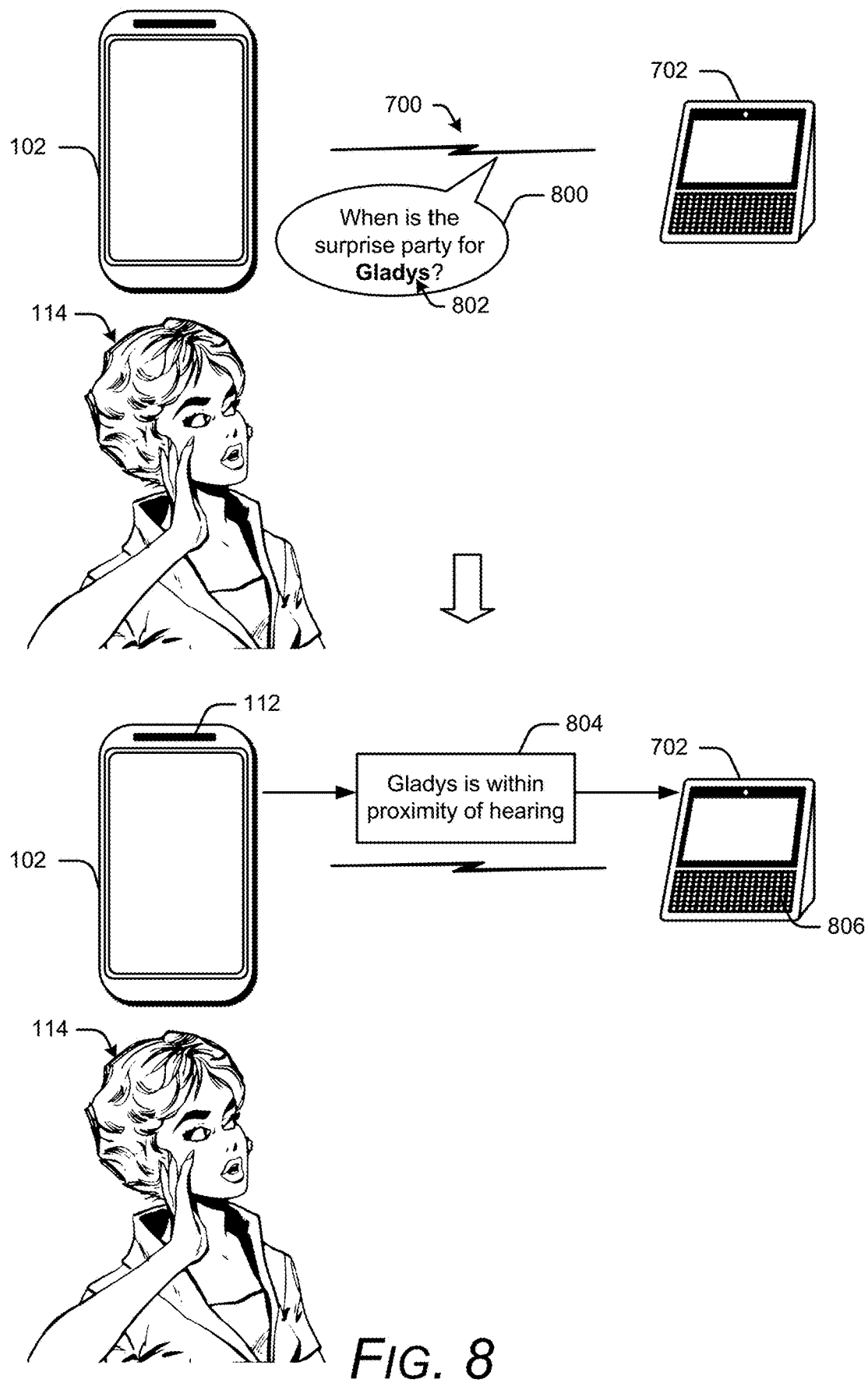
FIG. 8 illustrates an example call alert in accordance with one or more implementations.

To further demonstrate, consider now FIG. 8 that includes communication device 102 of FIG. 1, and remote home assistant 702 of FIG. 7. In various implementations, FIG. 8 can be considered a continuation of one or more examples described with respect to FIGS. 1-7. In the upper portion of FIG. 8, the communication device and the remote home assistant conduct communication session 700 as described with respect to FIG. 7. Similarly, person 114 remains within proximity to communication device 102, where the user's identity has been determined. Based on the proximity context, communication device 102 has knowledge that person 114 is within hearing proximity, and additionally knows the identity of person 114. At some arbitrary point during the communication session, remote home assistant 702 transmits audio 800 across the communication session, where the audio includes user name 802 that corresponds to the identity of person 114. In other words, since the communication device knows the identity of person 114, various implementations use this information to scan for associated keywords (e.g., the user's name). Thus, proximity context can include keyword identification in content transmitted across the communication session.

Moving to the lower portion of FIG. 8, communication device 102 determines to modify communication session 700 by generating an audible alert 804. Here, communication device 102 transmits the audible alert 804 across the communication session in a format that enables remote home assistant 702 to consume the audible alert (e.g., play out the alert at a speaker 806). Alternately or additionally, communication device 102 plays the audible alert 804 at speaker 112 at an audio output level determined using various techniques described herein.

In some scenarios, a communication device determines an attenuation amount that renders the output audio inaudible. For instance, consider an instance in which the communication device conducts a private mode communication session with the current audio output level set to 25% of the maximum supported audio output level. At some arbitrary point in time during the communication session, the communication device determines (via the proximity context) that a non-call participant is located within the surrounding area. In response to this determination, the communication device identifies an attenuation level to apply to the current audio output level. However, prior to applying the attenuation level, the communication device additionally identifies that, based on the current audio output level, applying the identified attenuation level would result in inaudible audio (e.g., below an audible sound threshold). Accordingly, instead of applying the identified attenuation level, various implementations provide an alert that indicates the conversation is not private and/or the audio output level has been adjusted to a minimum audible level instead of an audio output level based on the identified attenuation.

Figure 9:
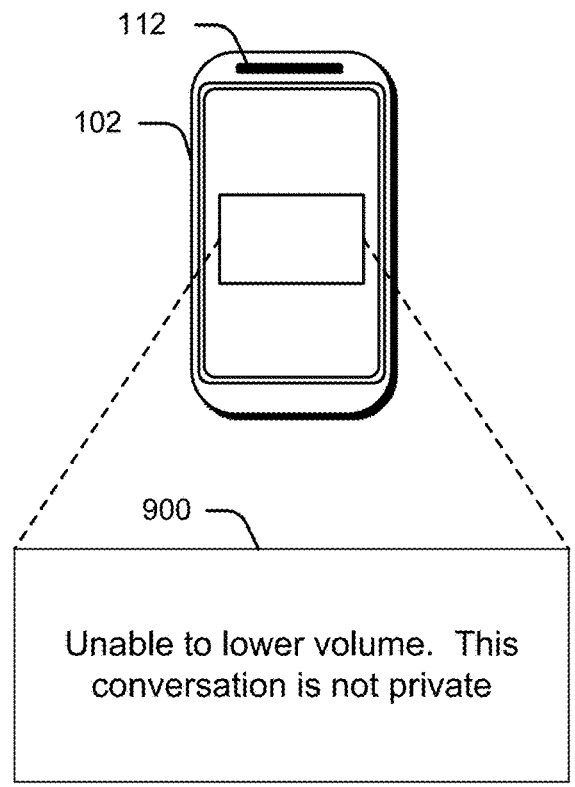
FIG. 9 illustrates an example alert generated in response to proximity context detection in accordance with one or more implementations.
Figure 9:
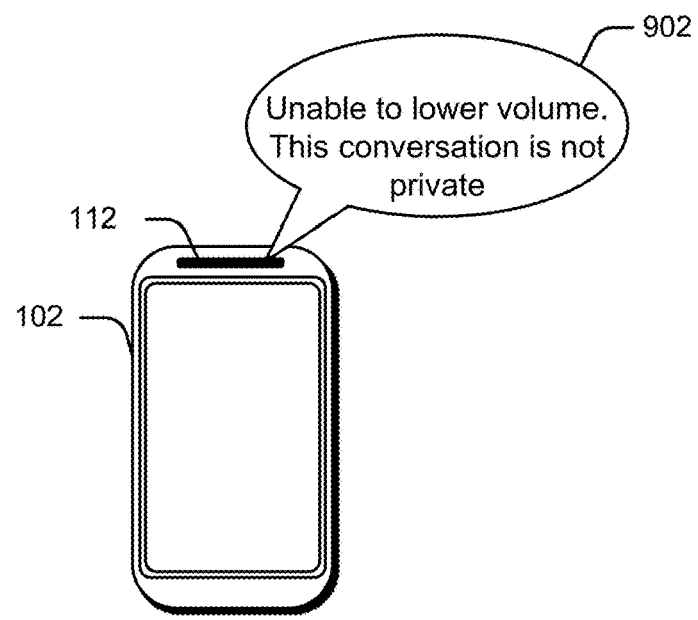

To illustrate, consider now FIG. 9 that demonstrates example alerts in accordance with one or more implementations. In various scenarios, FIG. 9 can be considered a continuation of one or more examples described with respect to FIGS. 1-8. The upper portion of FIG. 9 includes communication device 102 of FIG. 1, where the communication device has determined that the identified attenuation level would render audio output at speaker 112 inaudible. Accordingly, communication device 102 displays alert 900 to indicate to the user that the current conversation is not private and/or at risk of being overheard. Alternately or additionally, the communication device reduces the audio output level to a minimum audible output level, rather than an audio output level with the identified attenuation level. The minimum audible output level can be determined in any suitable manner, such as through a default value, a lookup table, and so forth. Some implementations play an audible alert that indicates the communication session is not private, such as alert 902 output on speaker 112 illustrated in the lower portion of FIG. 9. While the visual alert and the audible alert are illustrated separately in FIG. 9, other implementations display an alert and output an audible alert concurrently and/or transmit the alter(s) to the remote communication device participating in the communication session.

By automatically scanning a surrounding area to determine a proximity context, a communication device can help protect information exchanged over the session by automatically modifying the communication session when perceived risks are identified. This can include the communication device automatically accessing lookup tables and/or default values to help determine what parameters to change and how. However, sometimes the user desires to have more control over how a communication session gets modified. Accordingly, various implementations provide the user with access to enter user-defined configuration settings to drive what modifications are applied based on a proximity context.

Figure 10:
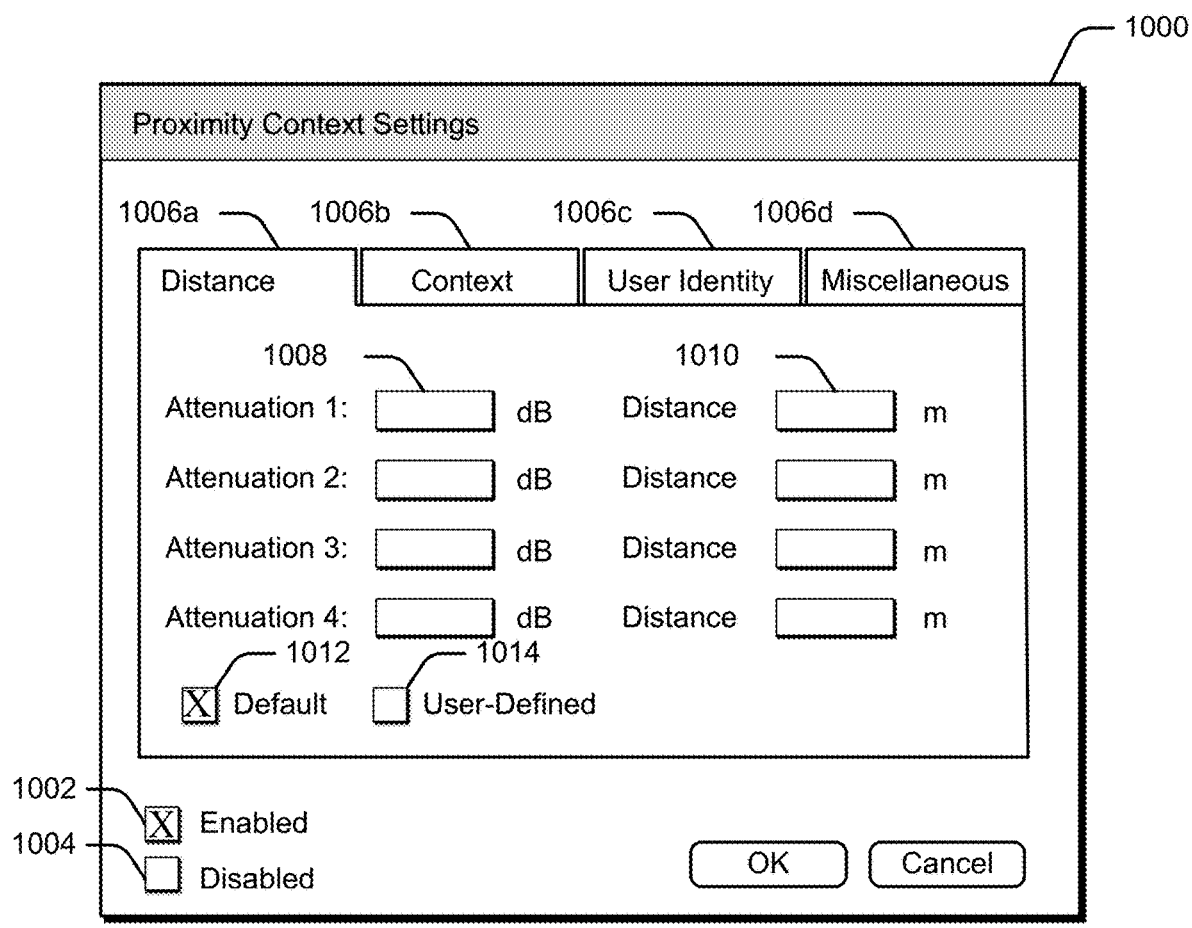
FIG. 10 illustrates an example user interface that can be used to customize call parameter modifications based on proximity context detection in accordance with one or more implementations.

Consider now FIG. 10 that illustrates an example user interface in accordance with one or more implementations. In various scenarios, FIG. 10 illustrates a continuation of one or more examples described with respect to FIGS. 1-9. FIG. 10 includes example user interface 1000 that represents any suitable type of user interface displayed by a communication device, such as communication device 102 of FIG. 1. Here, user interface 1000 provides the user with an ability to enter user-defined configuration settings associated with a proximity context. As an example, user interface 1000 includes selectable control 1002 and selectable control 1004 which provide the user with the ability to enable and disable modifications based on a proximity context. By activating selectable control 1002 (labeled "Enabled"), the user directs the communication device to modify a communication session based on a proximity context as further described herein. Conversely, by activating selectable control 1004 (labeled "Disabled"), the user directs the communication device to ignore and/or disallow modifications to a communication session based on a proximity context.

As another example, user interface 1000 includes navigable tab 1006a (labeled "Distance"), navigable tab 1006b (labeled "Context"), navigable tab 1006c (labeled "User Identity"), and navigable tab 1006d (labeled "Miscellaneous"). When selected, each navigable tab exposes user-defined configuration settings. For example, navigable tab 1006a includes text fields that enable the user to designate what attenuation level is applied for various distance locations of non-call participants. Thus, data entered into text field 1008 corresponds to an attenuation amount, such as 10, 5, 20, etc., which user interface 1000 further denotes by displaying a unit of measure ("dB") for each respective input field. Similarly, data entered into text field 1010 corresponds to a distance associated with the attenuation amount entered in text field 1008, which user interface 1000 denotes by displaying a unit of measure ("m") at each respective input field. In turn, the communication device can use the values entered in each of these fields to determine attenuation levels as further described herein. For example, some implementations generate a new lookup table with the user-defined information. Alternately or additionally, the user can activate control 1012 to indicate that the communication device should use default values for an attenuation-to-distance lookup table, or activate control 1014 to indicate that the communication device should use the user-defined settings.

Other types of settings can be exposed through user interface 1000 as well, such as user-defined proximity events through navigable tab 1000b (e.g., an identified velocity, a number of identified non-call participants, an identified key word, etc.). Navigable tab 1006c provides access to user-defined information about a particular user, such as an identified hearing loss, an indication to ignore communication session modifications for a particular user, etc. Navigable tab 1006d provides access to miscellaneous user-defined customizations, such as default sensors to enable for proximity context detection, proximity scanning periodicity, threshold values, and so forth. It is to be appreciated that the user-defined configuration settings described here are for discussion purposes, and that any other type of setting can be utilized to customize communication session modifications based on proximity detection.

Figure 11:
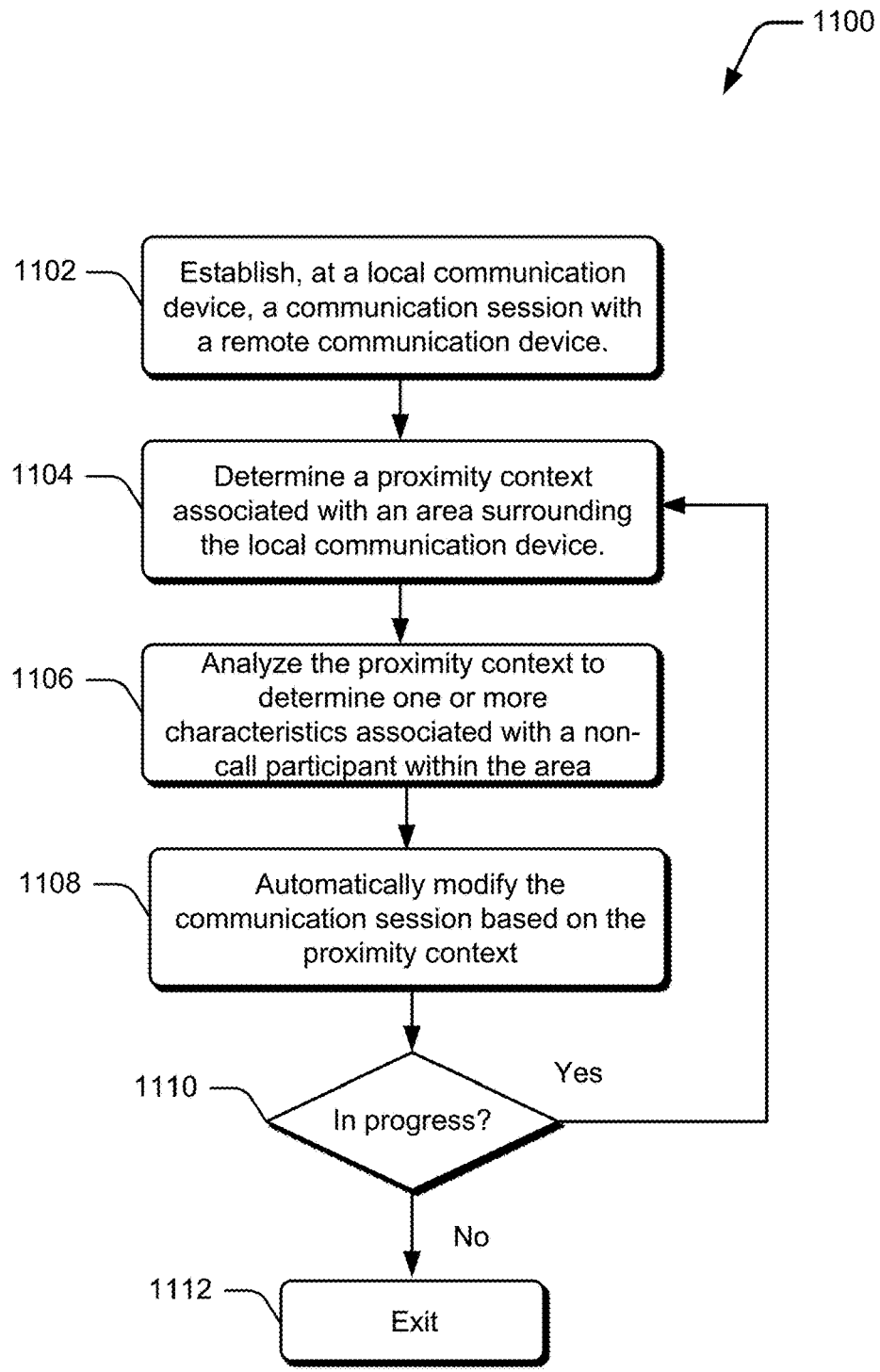
FIG. 11 illustrates a flow diagram that describes an example of modifying a communication session based on a proximity context in accordance with one or more implementations.

FIG. 11 illustrates a method 1100 that modifies a communication session based on a proximity context in accordance with one or more implementations. The method can be performed by any suitable combination of hardware, software, and/or firmware. In at least some embodiments, aspects of the method can be implemented by one or more suitably configured hardware components and/or software modules, such as communication module 110, device assistant module 116, range detection module 118, and/or identity detection module 120 of FIG. 1. While the method described in FIG. 11 illustrates these steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

At 1102, various implementations establish a communication session between a local communication device and a remote communication device. This can include any suitable type of communication session, such as a real-time voice communication session, a real-time video communication session, and so forth. In some implementations, the local communication device initiates the communication session, while in other implementations the remote communication device initiates the communication session. Various implementations include multiple remote communication devices in the communication session, such as a conference call.

At 1104, various implementations determine a proximity context associated with an area surrounding the local communication, such as by using a depth sensor to transmit and/or receive electromagnetic waveforms over a surrounding area as further described herein. Alternately or additionally, some implementations determine an operating context of the local communication device, such as whether the communication device is operating in a private mode or a speaker mode, where modifications to a communication are applied when the local communication device operates in the private mode, but are not applied when the local communication device operates in the speaker mode. Determining the proximity context can include using a single sensor, or multiple sensors as further described herein, where some implementations perform multiple iterations of transmitting waveforms, receiving waveforms, and analyzing the waveforms with a same sensor or different sensors for respective iterations.

Upon determining a proximity context, various implementations analyze the proximity context to determine one or more characteristics associated with a non-call participant within the area surrounding the local communication device at 1106. Some scenarios determine a presence, a distance, an identity, an age, a direction of movement, a direction in which the user faces relative to the local communication device, identifying key words, and so forth. This can include applying facial recognition algorithms, voice recognition algorithms, speech recognition algorithms, and so forth. Alternately or additionally, some implementations identify whether to apply modifications and/or what modifications to apply based on the proximity context, such as by accessing a lookup table to determine attenuation levels as further described herein.

In response to analyzing the proximity context, various implementations automatically modify the communication session based on the proximity context at 1108, such as by displaying an alert at the local communication device, transmitting an audible alert to the remote communication device over the communication session, attenuating the output audio level, amplifying the output audio level, and so forth.

Upon making the modification(s), various implementations proceed to 1110 to determine whether the communication session is still in progress. When it has been determined that the communication session has ended, the method proceeds to 1112. However, if the communication session is still in progress, some implementations return to 1104 to determine a new proximity context and/or whether to make any new modifications. Accordingly, various aspects scan the surrounding area over the duration of the communication session to make modifications based on new proximity context information in real-time. In turn, updates to the proximity context can influence how modifications are selected.

Figure 12:
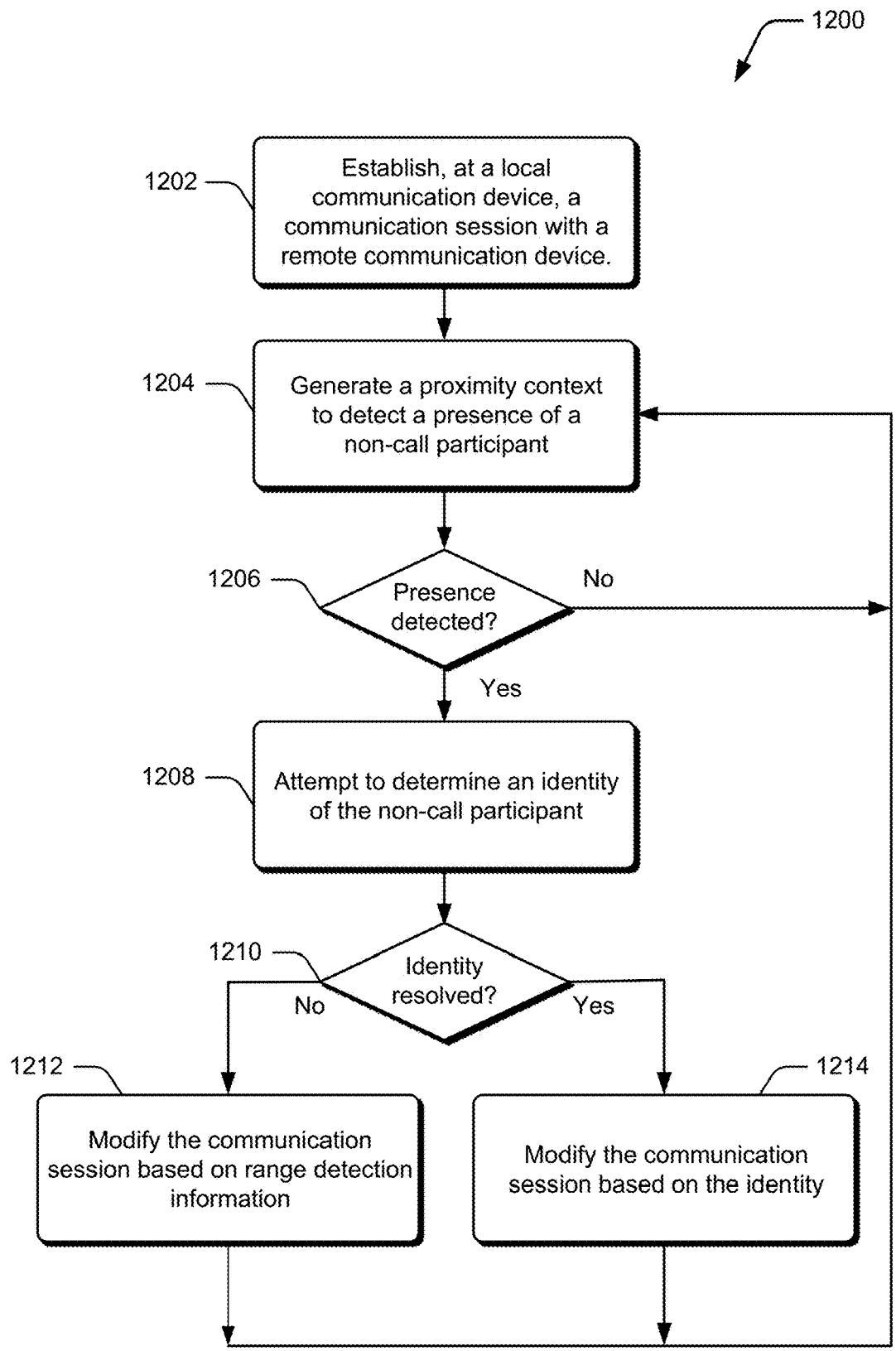
FIG. 12 illustrates a flow diagram that identifies externally playing audio during moments of interest in accordance with one or more implementations.

To illustrate, consider now FIG. 12 that illustrates a method 1200 that switches how modifications based a proximity context are selected in accordance with one or more implementations. The method can be performed by any suitable combination of hardware, software, and/or firmware. In at least some embodiments, aspects of the method can be implemented by one or more suitably configured hardware components and/or software modules, such as communication module 110, device assistant module 116, range detection module 118, and/or identity detection module 120 of FIG. 1. While the method described in FIG. 12 illustrates these steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

At 1202, various implementations establish a communication session between a local communication device and a remote communication device. This can include any suitable type of communication session, such as a real-time voice communication session, a real-time video communication session, and so forth. In some implementations, the local communication device initiates the communication session, while in other implementations the remote communication device initiates the communication session. Various implementations include multiple remote communication devices in the communication session, such as a conference call.

In response to establishing the communication session, some implementations generate a proximity context to detect a presence of a non-call participant 1204. Alternately or additionally, various implementations identify various characteristics about the non-call participant as further described herein. Generating the proximity context can include using a depth sensor, an audio sensor, a camera, and so forth. Some implementations transmit electromagnetic waves, and analyze captured return waves to determine the presence of the non-call participant. Accordingly, at 1206, the method determines whether a presence of a non-call participant is detected by analyzing the proximity context. If no presence is detected, the method returns to 1204, and continues to scan for the presence of a non-call participant. However, if a presence is detected, the method proceeds to 1208.

At 1208, various implementations attempt to determine an identity of the non-call participant, examples of which are provided herein. Accordingly, the method proceeds to 1210 to determine whether an identity of the non-call participant has been resolved. If the identity has not been resolved, the method proceeds to 1212 for range-based modifications. Conversely, if the identity has been resolved, the method proceeds to 1214 for identity-based modifications.

At 1212, various implementations modify the communication session based on range detection information, such as distance, directional information (e.g., what way the non-call participant is facing, what direction the non-call participant is moving in), and so forth. This can include modifications based on other types of proximity context information as well, such as background noise levels, proximity alerts based on distance (e.g., "there is a person located within hearing distance"), and so forth. However, since the identity has not been resolved, these modifications do not include identity-based modifications.

However, in response to resolving the identity, various implementations modify the communication session based on the identity as further described herein. For example, as further described herein, some implementations store user-defined configuration settings for a particular user, such as "Ignore modifications for Gladys", "Send audible alert when Gladys is identified", and so forth. In turn, the user-defined configuration settings are used to determine how to modify the communication session in lieu of other modifications. Alternately or additionally, some implementations combine the identity-based modifications with distance-based modifications.

When the communication session has been modified, such as at 1212 or 1214, the method returns to 1204 to repeat the process, and generate a new proximity context that can be used to monitor the presence of the non-call participant and/or other characteristics associated with the detected non-call participant. This allows for real-time updates such that the communication device can discern when the non-call participant moves closer or further away. In turn, this can change how the communication device identifies and/or applies modifications to the communication session. For example, consider a scenario in which the non-call participant is initially too far away for the communication device to resolve an identity. In such a scenario, the communication device would apply range-based modifications to the communication session since the identity was unresolved. However, as the non-call participant moves closer, the communication device is able to resolve an identity, and switches to a different detection system (e.g., switches from a range-based detection system to an identity-based detection system). Accordingly, by continuously monitoring for a presence of a non-call participant (as well as generating a proximity context), a communication device can make modifications in real-time. In turn, this helps the communication device protect information without active user input during the communication session.

Having described various examples of communication session modifications based on a proximity context, consider now a discussion of an example device in which can be used for various implementations.

Example Device

Figure 13:
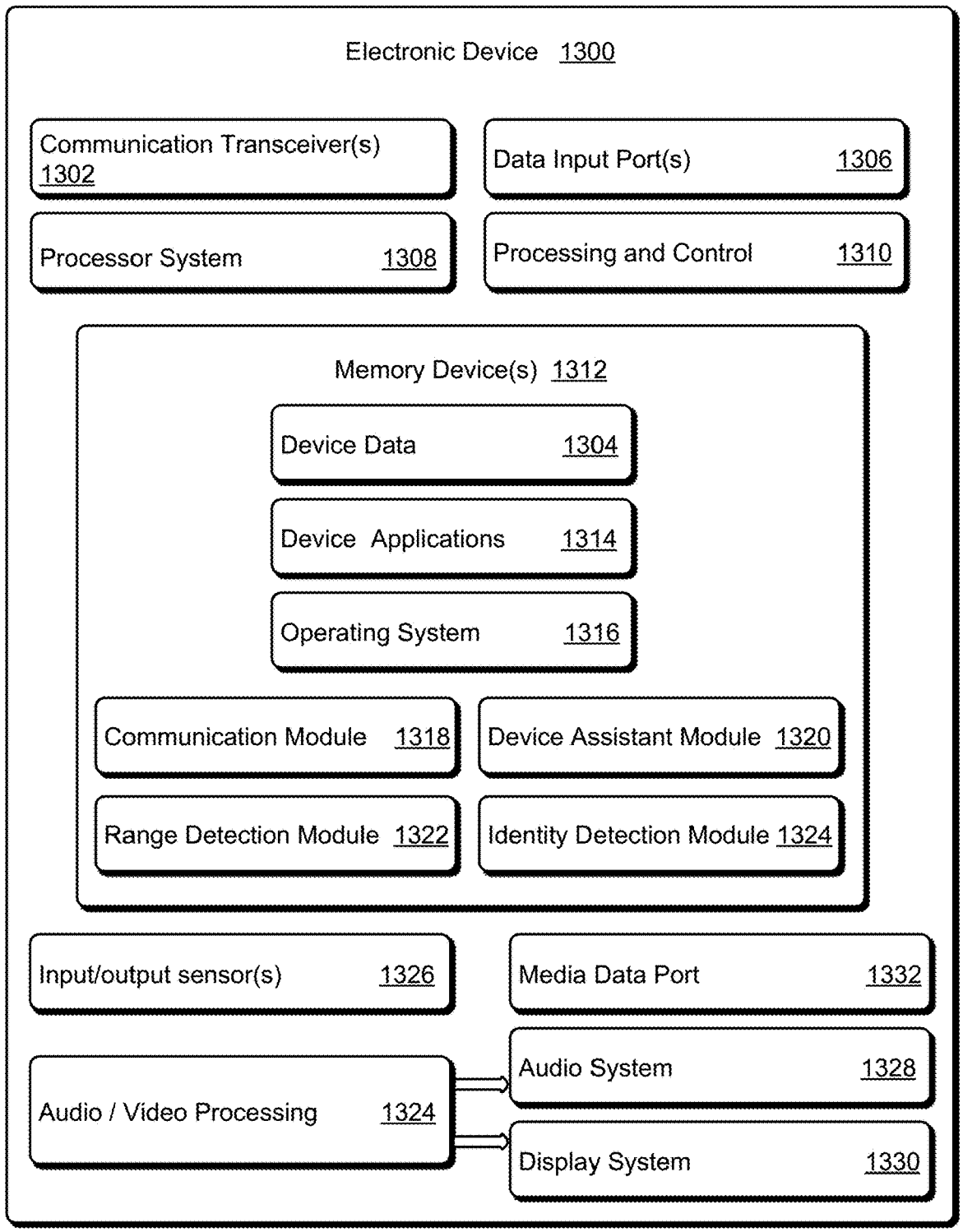
FIG. 13 is an illustration of an example device in accordance with one or more implementations.

FIG. 13 illustrates various components of an example electronic device 1300, such as communication device 102 of FIG. 1, which can be utilized to implement various aspects as further described herein. Electronic device 1300 can be, or include, many different types of devices capable of realizing automatic image association with an audio track in accordance with one or more implementations.

Electronic device 1300 includes communication transceivers 1302 that enable wired or wireless communication of device data 1304, such as received data and transmitted data. While referred to as a transceiver, it is to be appreciated that communication transceivers 1302 can additionally include separate transmit antennas and receive antennas without departing from the scope of the claimed subject matter. Example communication transceivers include Wireless Personal Area Network (WPAN) radios compliant with various Institute of Electrical and Electronics Engineers (IEEE) 802.15 (Bluetooth™) standards, Wireless Local Area Network (WLAN) radios compliant with any of the various IEEE 802.11 (WiFi™) standards, Wireless Wide Area Network (WWAN) radios for cellular telephony (3GPP-compliant), wireless metropolitan area network radios compliant with various IEEE 802.16 (WiMAX™) standards, and wired Local Area Network (LAN) Ethernet transceivers.

Electronic device 1300 may also include one or more data-input ports 1306 via which any type of data, media content, and inputs can be received, such as user-selectable inputs, messages, music, television content, recorded video content, and any other type of audio, video, or image data received from any content or data source. Data-input ports 1306 may include Universal Serial Bus (USB) ports, coaxial-cable ports, and other serial or parallel connectors (including internal connectors) for flash memory, Digital Versatile Discs (DVDs), Compact Disks (CDs), and the like. These data-input ports may be used to couple the electronic device to components, peripherals, or accessories such as keyboards, microphones, or cameras.

Electronic device 1300 of this example includes processor system 1308 (e.g., any of application processors, microprocessors, digital-signal processors, controllers, and the like) or a processor and memory system (e.g., implemented in a system-on-chip), which processes computer-executable instructions to control operation of the device. A processing system may be implemented at least partially in hardware, which can include components of an integrated circuit or on-chip system, digital-signal processor, application-specific integrated circuit, field-programmable gate array, a complex programmable logic device, and other implementations in silicon and other hardware. Alternatively, or in addition, the electronic device can be implemented with any one or combination of software, hardware, firmware, or fixed-logic circuitry that is implemented in connection with processing and control circuits, which are generally identified as processing and control 1310. Although not shown, electronic device 1300 can include a system bus, crossbar, interlink, or data-transfer system that couples the various components within the device. A system bus can include any one or combination of different bus structures, such as a memory bus or memory controller, data protocol/format converter, a peripheral bus, a universal serial bus, a processor bus, or local bus that utilizes any of a variety of bus architectures.

Electronic device 1300 also includes one or more memory devices 1312 that enable data storage, examples of which include random access memory (RAM), non-volatile memory (e.g., read-only memory (ROM), flash memory, EPROM, EEPROM, etc.), and a disk storage device. Memory devices 1312 are implemented at least in part as a physical device that stores information (e.g., digital or analog values) in storage media, which does not include propagating signals or waveforms. The storage media may be implemented as any suitable types of media such as electronic, magnetic, optic, mechanical, quantum, atomic, and so on. Memory devices 1312 provide data storage mechanisms to store the device data 1304, other types of information or data, and various device applications 1314 (e.g., software applications). For example, operating system 1316 can be maintained as software instructions within memory devices 1312 and executed by processor system 1308.

In some aspects, memory devices 1312 includes communication module 1318, device assistant module 1320, range detection module 1322, and identity detection module 1324. While these modules are illustrated and described as residing within memory devices 1312, other implementations of these modules can alternately or additionally include software, firmware, hardware, or any combination thereof.

Communication module 1318 manages various aspects of a communication session, such as initiating and/or managing protocol messaging used to establish a communication session over a network. Alternately or additionally, communication module 1318 interfaces with various sensors, such as an audio input sensor and/or video input sensor, to obtain audio and/or video to transmit over the communication session. Various implementations alternately or additionally output audio and/or video received over the communication session as further described herein.

Device assistant module 1320 provides call management capabilities, such as the ability to modify various parameters associated with a communication session as further described herein. This can include analyzing a proximity context associated with an area surrounding electronic device 1300 and/or an operating context to determine what modifications to apply while the communication session is in progress.

Range detection module 1322 maps an area surrounding the communication device to provide a proximity context, such as through the use of a depth sensor as further described herein. In turn, the proximity context can be used by device assistant module 1320 and/or identity detection module 1324 to determine what modifications to apply to the communication session. Identity detection module 1324 provides authentication of a user's identity, such as through facial recognition algorithms and/or voice recognition. Alternately or additionally, identity detection module 1324 identifies various key words through speech recognition algorithms applied to audio as further described herein.

Electronic device 1300 also includes input/output sensors 1326 which generally represent any combination of sensors that can be used to determine a proximity context, examples of which are provided herein. Various implementations of range detection module 1322 and/or identity detection module 1324 interface with, configure, and/or control various features of input/output sensors 1326 to determine a proximity context and/or an identity of a non-call participant, such as when a sensor is enabled/disabled, what direction electromagnetic waves are transmitted in, a radiation pattern, and so forth.

Electronic device also includes audio and video processing system 1328 that processes audio data and passes through the audio and video data to audio system 1330. Audio system 1330 and display system 1332 may include any modules that process, display, or otherwise render audio, video, display, or image data. Display data and audio signals can be communicated to an audio component and to a display component via a radio frequency link, S-video link, HDMI, composite-video link, component-video link, digital video interface, analog-audio connection, or other similar communication link, such as media-data port 1334. In some implementations, audio system 1330 and display system 1332 are external components to electronic device 1300. Alternatively, or additionally, audio system 1330 and/or display system 1332 can be an integrated component of the example electronic device 1300, such as part of an integrated speaker and/or an integrated display and touch interface.

Display system 1332 represents any suitable system that can be used to render images, such as an organic light-emitting diode (OLED) display, Liquid Crystal Display (LCD), a light-emitting diode display (LED), an electroluminescent display (ELD), a plasma display panel (PDP), and so forth. In some implementations, display system 1332 includes touch input capabilities, where input can be received through physical interactions with the display device (e.g., fingers, styluses, etc.). Various implementations use combinations of hardware, firmware and/or software to generate a device capable of rendering content.

In view of the many possible aspects to which the principles of the present discussion may be applied, it should be recognized that the implementations described herein with respect to the drawing figures are meant to be illustrative only and should not be taken as limiting the scope of the claims. Therefore, the techniques as described herein contemplate all such implementations as may come within the scope of the following claims and equivalents thereof.

We claim:

1. A method comprising:
   establishing, at a local communication device, a communication session with a remote communication device;
   identifying, using the local communication device and while the communication session is in progress, a presence of a non-call participant in an area surrounding the local communication device;
   determining an identity of the non-call participant;
   in response to determining the identity of the non-call participant, scanning communications from the remote computing device for a keyword associated with the identity; and
   in response to identifying the keyword in the communications from the remote computing device, automatically, and without human intervention, forwarding an audible alert to the remote computing device that indicates that the communication session is not private and indicates the presence of the non-call participant.

2. The method as recited in claim 1, wherein said determining comprises determining the identity by using a facial recognition algorithm.

3. The method as recited in claim 1, wherein said determining comprises determining the identity by using a voice recognition algorithm.

4. The method as recited in claim 1 further comprising:
   using the identity to determine an age associated with the non-call participant;
   determining an attenuation to apply to an audio output level associated with the communication session based, at least in part, on the age; and
   applying the attenuation to audio output at the local communication device.

5. The method as recited in claim 4, wherein said determining the attenuation further comprises determining the attenuation based on range detection information.

6. The method as recited in claim 4, further comprising:
   determining that the non-call participant has moved outside of the area surrounding the local communication device; and
   amplifying the audio output level to revert back from said applying the attenuation to the audio output.

7. The method as recited in claim 1 further comprising modifying the communication session based on the identity of the non-call participant by using user-defined settings to determine how to perform said modifying.

8. A local communication device comprising:
   one or more sensors;
   one or more processors; and
   one or more processor-executable instructions that, responsive to execution by the one or more processors, enable the communication device to perform operations including:
      establishing, at the local communication device, a communication session with a remote communication device;
      identifying, using the one or more sensors while the communication session is in progress, a presence of a non-call participant in an area surrounding the local communication device;
      determining an identity of the non-call participant;
      in response to determining the identity of the non-call participant, scanning communications from the remote computing device for a keyword associated with the identity; and
      in response to identifying the keyword in the communications from the remote computing device, automatically, and without human intervention, forwarding an audible alert to the remote computing device that indicates that the communication session is not private and indicates the presence of the non-call participant.

9. The communication device as recited in claim 8, wherein said determining further comprises determining the identity by using a facial recognition algorithm.

10. The communication device as recited in claim 8, said operations further including:
    using the identity to determine an age associated with the non-call participant;
    determining an attenuation to apply to an audio output level associated with the communication session based, at least in part, on the age; and
    applying the attenuation to audio output at the local communication device.

11. The communication device as recited in claim 10, said operations further including:
    determining that the non-call participant has moved outside of the area surrounding the local communication device; and
    amplifying the audio output level to revert back from said applying the attenuation to the audio output.

12. The communication device as recited in claim 10, wherein said determining the attenuation further comprises determining the attenuation based on range detection information.

13. The communication device as recited in claim 8, said operations further including modifying the communication session based on the identity of the non-call participant by using user-defined settings to determine how to perform said modifying.

14. The communication device as recited in claim 8, wherein said one or more sensors include a depth sensor.

15. The communication device as recited in claim 8, wherein said determining further comprises determining the identity by using a voice recognition algorithm.

16. A local communication device comprising:
a communication module, implemented at least in part in hardware, to establish a communication session with a remote communication device;
an identity detection module, implemented at least in part in hardware, to identify, while the communication session is in progress, an identity of a non-call participant present in an area surrounding the local communication device and to, in response to determining the identity of the non-call participant, scan communications from the remote computing device for a keyword associated with the identity; and
a device assistant module, implemented at least in part in hardware, to, in response to identification of the keyword in the communications from the remote computing device, automatically, and without human intervention, modify the communication session by forwarding an audible alert to the remote computing device that indicates that the communication session is not private and indicates the presence of the non-call participant.

17. The communication device as recited in claim 16, the device assistant module being further to use the identity to determine an age associated with the non-call participant, determine an attenuation to apply to an audio output level associated with the communication session based, at least in part, on the age, and apply the attenuation to audio output at the local communication device.

18. The communication device as recited in claim 17, the device assistant module being further to determine that the non-call participant has moved outside of the area surrounding the local communication device, and amplify the audio output level to revert back from said application of the attenuation to the audio output.

19. The communication device as recited in claim 17, wherein to determine the attenuation is to determine the attenuation based on range detection information.

20. The communication device as recited in claim 16, the device assistant module being further to modify the communication session based on the identity of the non-call participant by using user-defined settings to determine how to perform said modification.

* * * * *